US010119616B2

(12) United States Patent
Tanju

(10) Patent No.: US 10,119,616 B2
(45) Date of Patent: Nov. 6, 2018

(54) MECHANICAL SEAL ASSISTANCE DEVICE AND SYSTEMS AND METHODS FOR USE THEREOF

(71) Applicant: Chevron U.S.A. Inc., San Ramon, CA (US)

(72) Inventor: Baha Tulu Tanju, Katy, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 475 days.

(21) Appl. No.: 15/093,955

(22) Filed: Apr. 8, 2016

(65) Prior Publication Data

US 2017/0292611 A1  Oct. 12, 2017

(51) Int. Cl.
| | | |
|---|---|---|
| F16J 15/34 | (2006.01) | |
| F04D 29/10 | (2006.01) | |
| F04D 29/06 | (2006.01) | |
| F04D 29/58 | (2006.01) | |
| F04D 29/60 | (2006.01) | |
| F16J 15/00 | (2006.01) | |
| F04D 15/00 | (2006.01) | |
| F04D 27/00 | (2006.01) | |
| F04D 29/12 | (2006.01) | |
| F16J 15/16 | (2006.01) | |

(52) U.S. Cl.
CPC ............ *F16J 15/346* (2013.01); *F04D 15/00* (2013.01); *F04D 27/00* (2013.01); *F04D 29/06* (2013.01); *F04D 29/10* (2013.01); *F04D 29/122* (2013.01); *F04D 29/126* (2013.01); *F04D 29/5806* (2013.01); *F04D 29/60* (2013.01); *F16J 15/004* (2013.01); *F16J 15/3452* (2013.01); *F05D 2240/55* (2013.01); *F05D 2260/20* (2013.01); *F05D 2260/98* (2013.01); *F05D 2270/303* (2013.01); *F05D 2300/505* (2013.01); *F16J 15/164* (2013.01); *F16J 15/34* (2013.01)

(58) Field of Classification Search
None
See application file for complete search history.

(56) References Cited

U.S. PATENT DOCUMENTS

| | | |
|---|---|---|
| 3,433,489 A | 3/1969 | Weise |
| 3,638,957 A | 2/1972 | Marsi |
| 3,972,536 A | 8/1976 | Warner et al. |
| 5,171,024 A | 12/1992 | Janocko |
| 5,607,165 A | 3/1997 | Bredemeyer |
| 5,772,216 A | 6/1998 | Bredemeyer |
| 6,224,061 B1 | 5/2001 | Roddis |
| 6,428,011 B1 | 8/2002 | Askouei |

(Continued)

*Primary Examiner* — Jason Shanske
*Assistant Examiner* — Behnoush Haghighian
(74) *Attorney, Agent, or Firm* — Karen R. DiDomenicis

(57) ABSTRACT

Disclosed is a device for regulating the compression force of a spring-spacer assembly provided in a mechanical shaft seal in a system including a motor and a pump or compressor. The device includes a spacer made from shape memory alloy, a spring in line with the spacer, and a heater proximate the spacer. When heated, the spacer contracts in length, resulting in a decrease in compression force. Also disclosed are systems and methods utilizing the device. The device is particularly useful when starting a pump or compressor to reduce friction in the mechanical seal. Existing mechanical seals can be easily retrofitted with the device.

18 Claims, 8 Drawing Sheets

(56) References Cited

U.S. PATENT DOCUMENTS

| | | |
|---|---|---|
| 7,086,649 B2 | 8/2006 | Plona |
| 7,300,060 B2 | 11/2007 | Zagres |
| 7,694,977 B2 | 4/2010 | Laitinen |
| 7,971,651 B2 | 7/2011 | Tanju et al. |
| 7,971,652 B2 | 7/2011 | Tanju et al. |
| 8,690,534 B1 * | 4/2014 | Janocko ................ F16J 15/164 277/508 |
| 2008/0079222 A1 * | 4/2008 | Namuduri ............. F16J 15/164 277/359 |
| 2010/0072706 A1 * | 3/2010 | Schmitz ............... F16J 15/3436 277/301 |
| 2010/0102518 A1 * | 4/2010 | Gao ...................... F16J 15/164 277/554 |
| 2013/0343932 A1 | 12/2013 | Stinessen |
| 2014/0161589 A1 | 6/2014 | Janocko et al. |
| 2015/0221400 A1 * | 8/2015 | Saeki .................. F16J 15/3272 376/203 |

* cited by examiner

MECHANICAL SEAL ASSISTANCE DEVICE AND SYSTEMS AND METHODS FOR USE THEREOF

FIELD

The present disclosure relates to a device for use in a mechanical rotary shaft seal for use in a pump or compressor system.

BACKGROUND

Mechanical rotary shaft seals, also referred to as mechanical shaft seals, are among the most important parts of a pump system. In most cases, the mechanical rotary shaft seal is the barrier between the surrounding environment and the fluid being pumped. In the case of a subsea pump, the mechanical shaft seal is the barrier between the motor cooling fluid, also referred to as the barrier fluid, and the production fluid, e.g., oil, water, gas and optional chemicals and inhibitors. The barrier fluid used in the subsea pump system serves a number of purposes. Barrier fluid cools the pump motor, works as an insulator between the motor housing and the motor stator, prevents production fluid ingress into the motor, and lubricates the bearings and the mechanical shaft seal. If the barrier fluid is contaminated by production fluid, a catastrophic pump system failure such as a motor, mechanical shaft seal and/or bearing failure could occur. A significant portion of all topside and onshore pump failures are caused by mechanical shaft seal failure. This is especially problematic for subsea pump systems.

The operation of known mechanical shaft seals includes the use of a spring mechanism that regulates the distance between the face of the stationary part of the mechanical seal that faces the rotating part of the mechanical seal. This distance or gap is a critical part of the mechanical seal and is at the heart of the seal. This gap generally has a thin lubricating film of fluid therein, either the pumped fluid and/or a barrier fluid. When the pump is started up initially as well as at shutdown and at other times when the pump is running, friction in this gap can become critical. The film thickness and the gap is the function of pump speed and compression force applied by the spring of the mechanical seal. When the pump is stopped the lubrication film thickness becomes nearly zero. Most mechanical shaft seal wear and tear happens at pump start-up. Late in the life of the pump, due to wear, the friction increases between the two mechanical shaft seal faces. The friction generates heat which may cause the mechanical seal to deform leading to accelerated deterioration on the seal surfaces and seal failure.

There exists a need for a mechanical shaft seal for use in pump or compressor systems that avoids or minimizes the aforementioned problems with known seals thereby extending the life of mechanical seals and pumps and compressors using them.

SUMMARY

In one aspect, a mechanical seal assistance device is provided for use in a mechanical shaft seal assembly in a motor/pump assembly having a motor and a pump or compressor. The motor drives a rotor coupled to a rotating shaft for operating the pump or the compressor. The mechanical seal assistance device includes a spring-spacer assembly. The spring-spacer assembly includes a spring having a first end and a second end; and a two-way shape memory alloy spacer having a first end and a second end. One of the first and second ends of the two-way shape memory alloy spacer is in contact with one of the first and second ends of the spring. The spring and the two-way shape memory alloy spacer are configured to rotate together with the rotor or the rotating shaft between a rotating mechanical seal component and a torque transmission component and apply a compression force on the rotating mechanical seal component and the torque transmission component. The two-way shape memory alloy spacer is formed of a shape memory alloy material having a contracting transition temperature such that the two-way shape memory alloy spacer contracts in length when the two-way shape memory alloy spacer is heated to a temperature above the contracting transition temperature. The mechanical seal assistance device further includes a heater capable of reversibly heating the two-way shape memory alloy spacer from a temperature below the contracting transition temperature to a temperature above the contracting transition temperature. When the two-way shape memory alloy spacer is heated from a temperature below the contracting transition temperature to a temperature above the contracting transition temperature, the spring-spacer assembly applies a reduced compression force on the rotating mechanical seal component and the torque transmission component.

In another aspect, a pump or compressor system is provided. The system includes a pump or compressor configured to continuously impart energy to a pumped or compressed fluid by means of a rotating shaft having a rotating component selected from impellers, propellers, and turbine blades. A motor is configured to drive a rotor coupled to the rotating shaft for operating the pump or the compressor. A coupling is configured to transfer rotary motion from the rotor to the rotating shaft of the pump or compressor. Bearings can be configured to encompass and support the rotating shaft at predetermined locations along the rotating shaft. A mechanical shaft seal assembly is configured to minimize leaking of the pumped or compressed fluid into a surrounding environment. The mechanical shaft seal assembly includes a rotating mechanical seal component, a torque transmission component for transmitting torque from the rotating shaft to the rotating mechanical seal component, and the mechanical seal assistance device described above located between the rotating mechanical seal component and the torque transmission component. The mechanical seal assistance device described above applies a compression force on the rotating mechanical seal component and the torque transmission component. The system can further include optional barrier fluid for lubricating and cooling the mechanical shaft seal assembly, cooling the motor and/or minimizing incidence of the pumped or compressed fluid contaminating the motor and the bearings.

In another aspect, a process for operating a subsea system is provided. According to the process, prior to starting up the subsea pump or compressor system described above, the heater is activated to heat the two-way shape memory alloy spacer of the mechanical seal assistance device until the two-way shape memory alloy spacer completes a phase change from martensite to austenite thereby shortening the two-way shape memory alloy spacer such that the spring-spacer assembly applies a reduced compression force on the-rotating mechanical seal component-and the torque transmission component. Next, the pump or compressor is started. The heater is then deactivated and the two-way shape memory alloy spacer is allowed to cool until the two-way shape memory alloy spacer completes a phase change from austenite to martensite thereby lengthening the two-way shape memory alloy spacer such that the spring-spacer assembly applies an increased compression force on the rotating mechanical seal component and the torque transmission component.

In yet another aspect, a process for retrofitting a mechanical shaft seal assembly in a subsea pump or compressor system is provided. First, an existing compression spring between and in contact with a rotating mechanical seal component and a torque transmission component in a pump mechanical shaft seal assembly is removed. In the place of the removed compression spring, the mechanical seal assistance device described above is installed such that the spring-spacer assembly is configured to rotate together with the rotor or the rotating shaft between the rotating mechanical seal component and the torque transmission component and apply a compression force on the rotating mechanical seal component and the torque transmission component.

DESCRIPTION OF THE DRAWINGS

These and other objects, features and advantages of the present invention will become better understood with reference to the following description, appended claims and accompanying drawings. The drawings are not considered limiting of the scope of the appended claims. The elements shown in the drawings are not necessarily to scale. Reference numerals designate like or corresponding, but not necessarily identical, elements.

DETAILED DESCRIPTION

Figure 1:
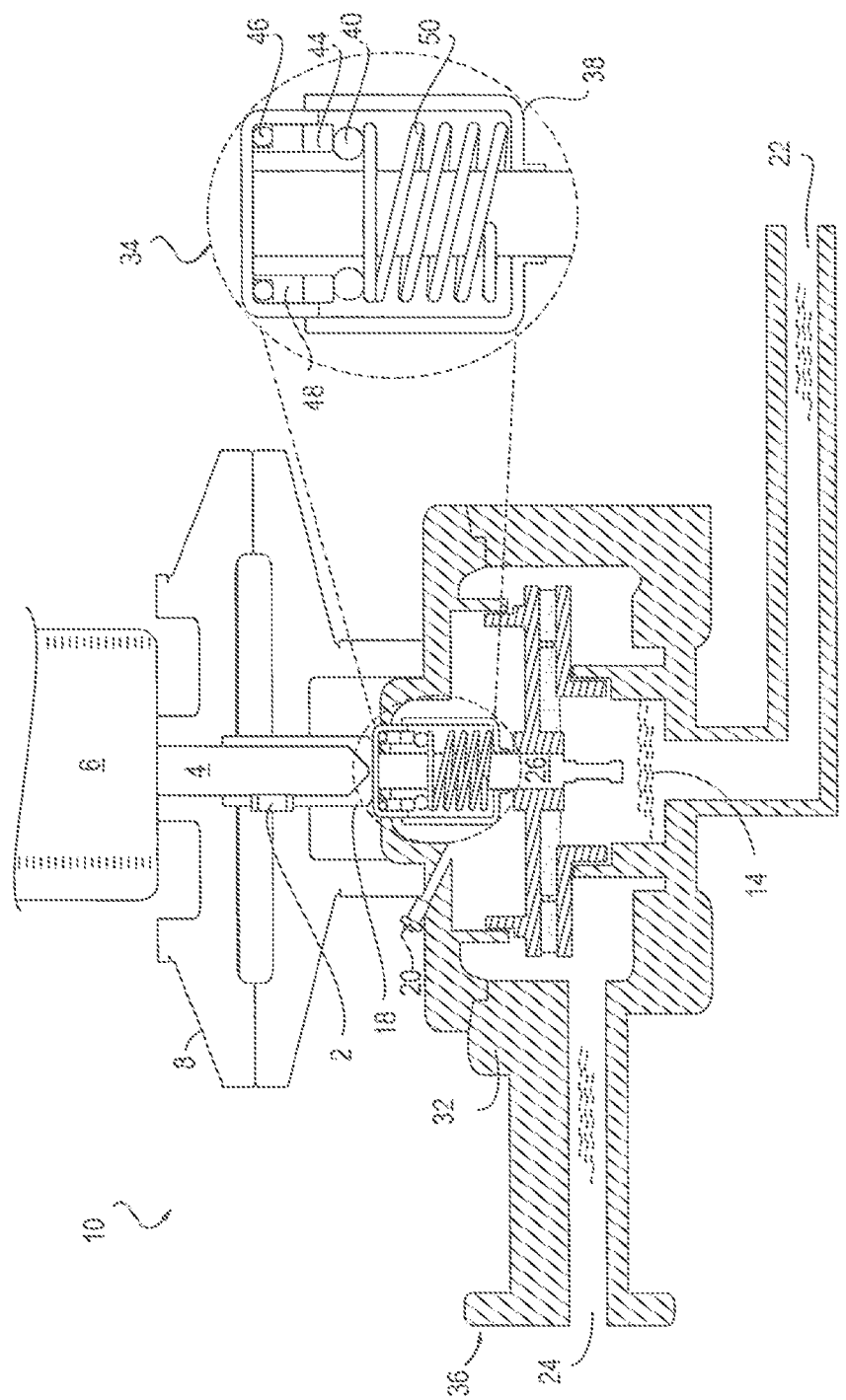
FIG. 1 is a sectional view of a motor/pump assembly according to the prior art.

FIG. 1 is a sectional view of a motor/pump assembly 10 according to the prior art. The assembly 10 includes a motor 6 for turning a rotor 4. The rotor 4 drives the rotating shaft 26 of a pump or compressor 36. The motor 6 can be any type of motor or turbine capable of turning the rotor 4. The pump or compressor 36 can be any type of centrifugal pump or compressor utilizing a rotating shaft 26, also referred to herein as the "shaft." The pump or compressor 36 is interchangeably referred to herein as "pump or compressor" and "pump." A coupling 18 may be provided for operative connection between the motor 6 and the pump or compressor 36. In the assembly shown in FIG. 1, a coupling area housing 8 surrounds the coupling 18. A key 12 can be provided in the rotor 4 for securing the coupling 18 to the rotor 4.

The rotating shaft 26 has impellers 28 thereon for directing the fluid 14 being pumped or compressed. The pump or compressor 36 has a fluid inlet 22 and an outlet 24. The pump or compressor 36 can further include diffusers (not shown) for cooperating with the impellers 28 to condition the fluid 14. The diffusers can be on an inner surface of the pump housing 32, as would be understood by one of ordinary skill in the art. The pump 36 can also include a thrust bearing on the shaft 26 (not shown). The pump or compressor 36 can further include a pressure relief valve 20. The motor/pump assembly 10 can further include axial and radial bearings (not shown) at locations along the rotor 4 and/or the shaft 26 to encompass and support the rotating shaft at predetermined locations along the rotor and/or rotating shaft.

At least one mechanical shaft seal 34 is provided for minimizing the fluid 14 being pumped or compressed from getting into the environment surrounding the pump 36. The mechanical shaft seal 34 can take any of a variety of configurations. As shown, the mechanical shaft seal 34 includes a stationary part 44 and an optional stationary rubber seal which can be an O-ring, also referred to as a stationary O-ring 46. A rotating part 42 has a surface that faces the stationary part 44. A lubricated film 48 exists in the gap between the rotating part 42 and the stationary part 44. A spring 50 and a rotating rubber seal which can be an O-ring, also referred to as O-ring 40, can be included to assist in maintaining pressure on the gap between the rotating part 42 and the stationary part 44. A torque transmission element 38 can be used to transfer torque from the rotating shaft 26 to the rotating part 42. Barrier fluid (not shown) can be supplied to the gap between the rotating part 42 and the stationary part 44 as needed to further reduce the incidence of the fluid 14 being pumped or compressed getting into the environment surrounding the pump 36 as would be understood by one of ordinary skill in the art.

Figure 2:
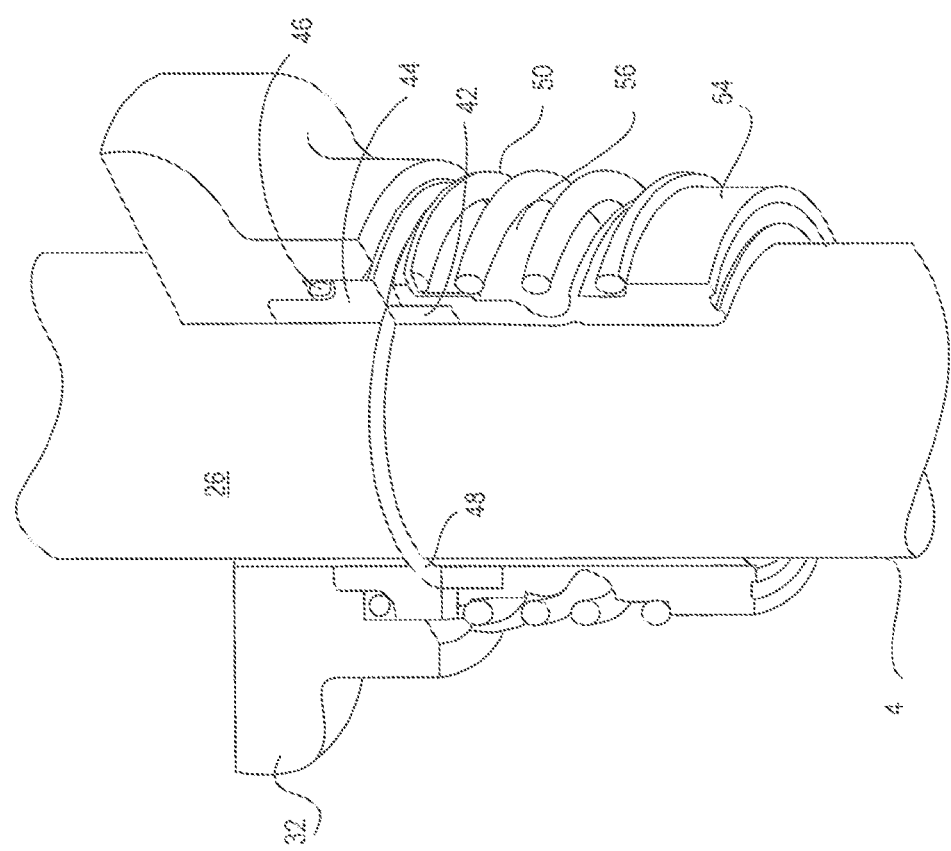
FIG. 2 is a cut-away view of a mechanical shaft seal according to the prior art.

FIG. 2 is a cut-away view of another type of mechanical shaft seal according to the prior art. The mechanical shaft seal shown differs from the mechanical shaft seal 34 of FIG. 1 in that the torque transmission element 38 is not used to transfer torque from the rotating shaft 26 to the rotating part 42, nor is the O-ring 40 used. Rather, a rubber bellows 54 is provided adjacent the shaft 26 and a pair of torque transmission rings 56 are provided surrounding the rubber bellows 54.

Figure 3:
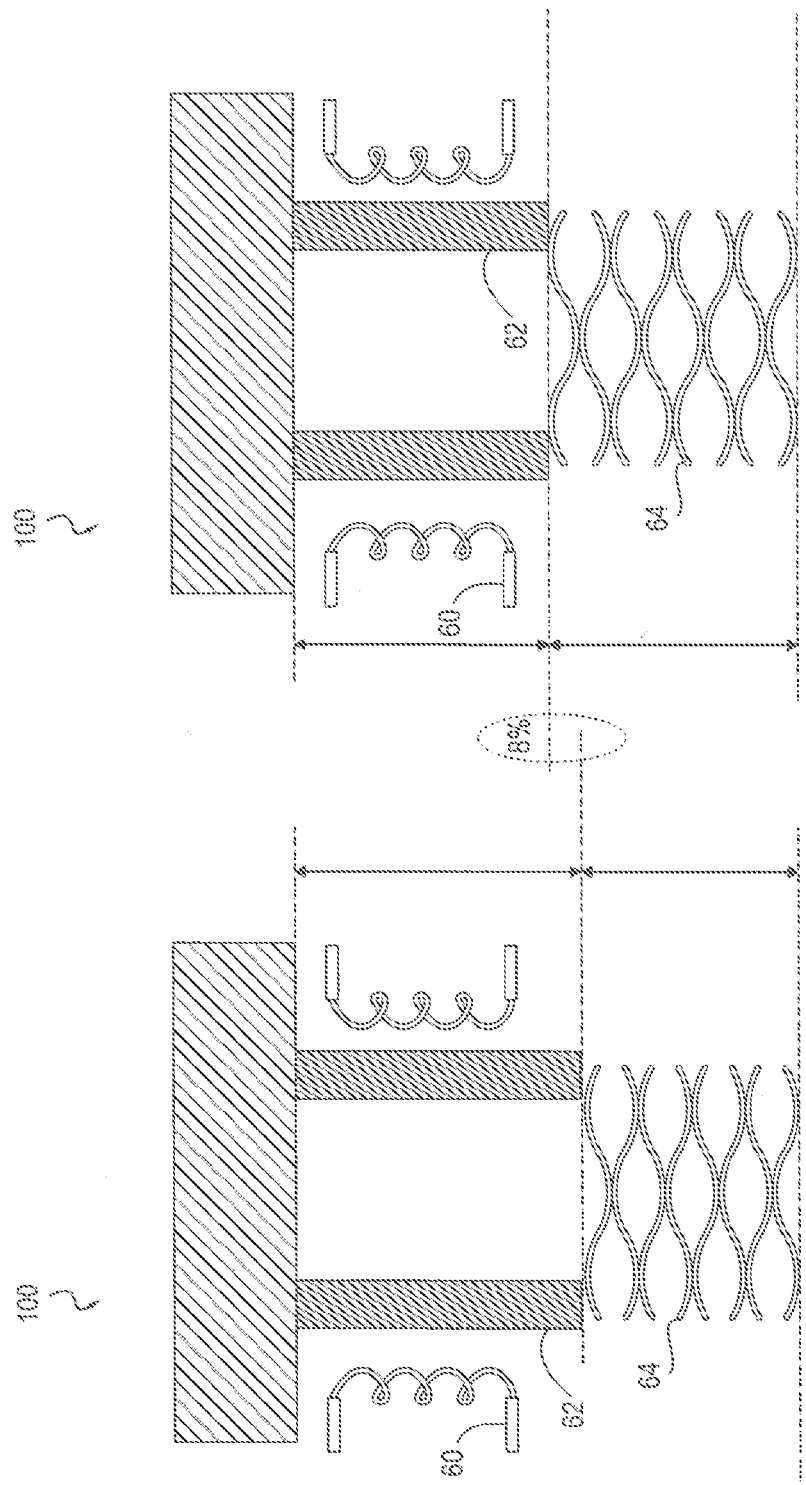
FIGS. 3A and 3B are sectional views of a mechanical seal assistance device according to an exemplary embodiment.

In one embodiment, as shown in FIGS. 3A and 3B, a mechanical seal assistance device 100 is provided for use in a mechanical shaft seal assembly such as those described above and shown in FIGS. 1 and 2. The mechanical seal assistance device 100 includes a spring-spacer assembly. The spring-spacer assembly includes a spring 64 having a first end and a second end; and a two-way shape memory alloy spacer 62 (also referred to herein as a spacer 62) having a first end and a second end. One of the first and second ends of the two-way shape memory alloy spacer 62 is in contact with one of the first and second ends of the spring 64. In one embodiment, the spring 64 can be a wave spring. The spring 64 and the two-way shape memory alloy spacer 62 are configured to rotate together with the rotating shaft 26 between a rotating part 42 of a mechanical seal 34 and a torque transmission element 38 and apply a compression force on the rotating part 42 (also referred to as the rotating mechanical seal component 42) and the torque transmission element 38 (also referred to as the torque transmission component 38 or 56, depending on the type of mechanical seal).

In one embodiment, as in the mechanical seal shown in FIG. 2, the torque transmission component 56 is a rubber bellows. In one embodiment, as in the mechanical seal shown in FIG. 2, the torque transmission element is a pair of torque transmission rings for transferring torque between the shaft and the spring-spacer assembly located adjacent the first and second ends of the spring-spacer assembly. The torque transmission ring 56 is actually a high friction coupling which creates a smooth metallic surface on which the spring 50 rests. If there is no torque transmission ring the spring 50 can damage the rubber bellow 54 while transferring torque from shaft 26 to spring 50.

The two-way shape memory alloy spacer 62 is formed of a shape memory alloy material having a contracting transition temperature such that the two-way shape memory alloy spacer 62 contracts in length when the two-way shape memory alloy spacer 62 is heated to a temperature above the contracting transition temperature. The mechanical seal assistance device 100 further includes a heater 60 capable of reversibly heating the two-way shape memory alloy spacer 62 from a temperature below the contracting transition temperature to a temperature above the contracting transition temperature. The heater 60 can take any of a variety of forms. The heater increases the temperature of the spacer 62 mainly by heat conduction. This requires the heater 60 to be in the vicinity of the spacer 62. In one embodiment, the spacer 62 has axial symmetry, and thus it is beneficial to position the heater 60 axially symmetrically around the spacer 62 to ensure uniform force applied by the spacer 62 to the spring 64. In one embodiment the spacer 62 can be heated by applying electrical current to the spacer 62 in which case the heater 60 is the source of electrical current. In one embodiment, the heater 60 is in the form of a control line for conducting heat to the shape memory alloy spacer 62. The control line can include one or more electrically conductive pathways for conducting electrical current across the shape memory alloy spacer 62. Heat energy can be provided via an electrical supply selected from a group comprising AC, DC and high voltage pulse width modulation.

When the two-way shape memory alloy spacer 62 is heated from a temperature below the contracting transition temperature to a temperature above the contracting transition temperature, the spring-spacer assembly applies a reduced compression force on the rotating mechanical seal component 42 and the torque transmission component 38 or 56.

As shown in FIGS. 3A and 3B, the spacer 62 will have a length as determined by the temperature. FIG. 3A illustrates the device 100 at a temperature of less than 55° C. when the shape memory alloy is nickel titanium or nitinol. FIG. 3B illustrates the device 100 at a temperature of greater than 65° C. As illustrated, when the heater 60 is activated, the spacer 62 will contract in length by about 8%.

In one embodiment, the shape memory alloy is nickel titanium and has a phase change range of from about 31° C. to about 66° C. Other shape memory alloys have a phase change range of from about 50° C. to about 90° C. The phase change temperature range can be fine-tuned in a wide range (such as between 27° C. to 282° C.) by adjusting amounts of nickel, titanium, palladium, platinum, hafnium and other components in the alloy. Some shape memory alloys are "trainable" (i.e., can leave reminders of a deformed low-temperature condition in high-temperature phases) and exhibit a phase change while-in-solid-form.

One or more noble metals (e.g., palladium or platinum) can be added to such shape memory alloys (e.g., nickel-titanium alloy) in order to achieve an ultra-high temperature shape memory alloy. In one embodiment, the shape memory alloy is an ultra-high temperature shape memory alloy, which refers to a shape memory alloy whose phase change range starts at 149° C. and higher. Examples of ultra-high temperature shape memory alloys include NiTiPd (nickel titanium palladium) and NiTiPt (nickel titanium platinum). Ultra-high temperature shape memory alloys may be especially well suited for downhole pump applications in oil and gas production.

Figure 4:
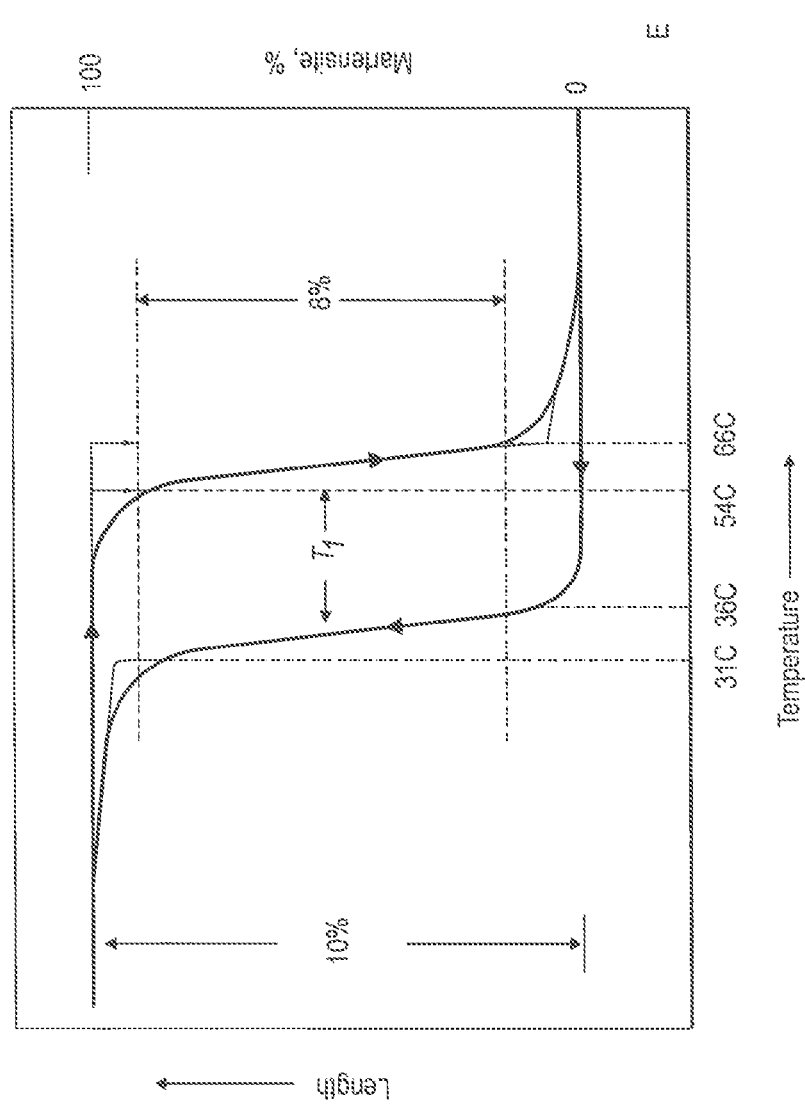
FIG. 4 is a length (strain) versus temperature plot for a mechanical seal assistance device according to an exemplary embodiment.

FIG. 4 is a length (strain) versus temperature plot for a spacer 62 for use in the mechanical seal assistance device 100 according to an exemplary embodiment when the shape memory alloy is nickel titanium. FIG. 4 illustrates the hysteresis of the temperature behavior for shape memory alloys in transition between martensite and austenite phases without mechanical loading. As can be seen, 31° C. is the temperature that austenite crystal structures appear, and 66° C. is the temperature that martensite crystal structures appear.

In one embodiment, a process for operating the above-described pump or compressor system is provided. According to the process, prior to starting up the pump system described above, the heater 60 is activated to heat the two-way shape memory alloy spacer 62 of the mechanical seal assistance device 100 until the two-way shape memory alloy spacer 62 completes a phase change from martensite to austenite thereby shortening the two-way shape memory alloy spacer 62 such that the spring-spacer assembly applies a reduced compression force on the rotating mechanical seal component 42 and the torque transmission component 38 or 56. Next, the pump or compressor 36 is started. The heater 60 is then deactivated and the two-way shape memory alloy spacer 62 is allowed to cool until the two-way shape memory alloy spacer 62 completes a phase change from austenite to martensite thereby lengthening the two-way shape memory alloy spacer 62 such that the spring-spacer assembly applies an increased compression force on the rotating mechanical seal component 42 and the torque transmission component 38 or 56.

Figures 5A, 5B:
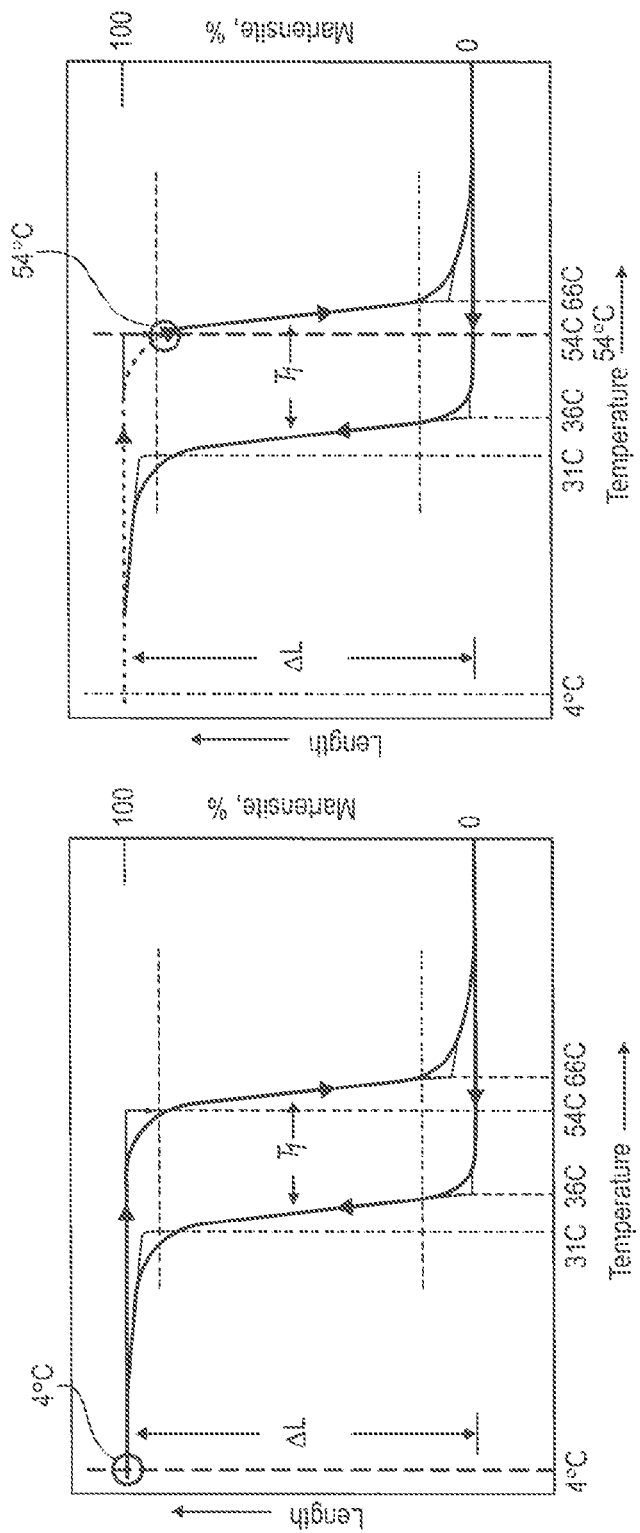
FIGS. 5A-5G are length (strain) versus temperature plots for a mechanical seal assistance device over a sequence of process steps according to an exemplary embodiment.
Figure 5D:
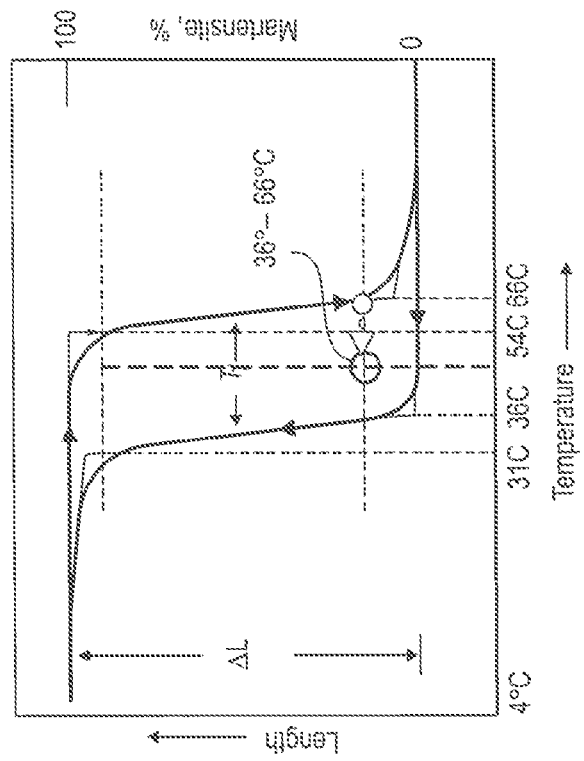
Figure 5C:
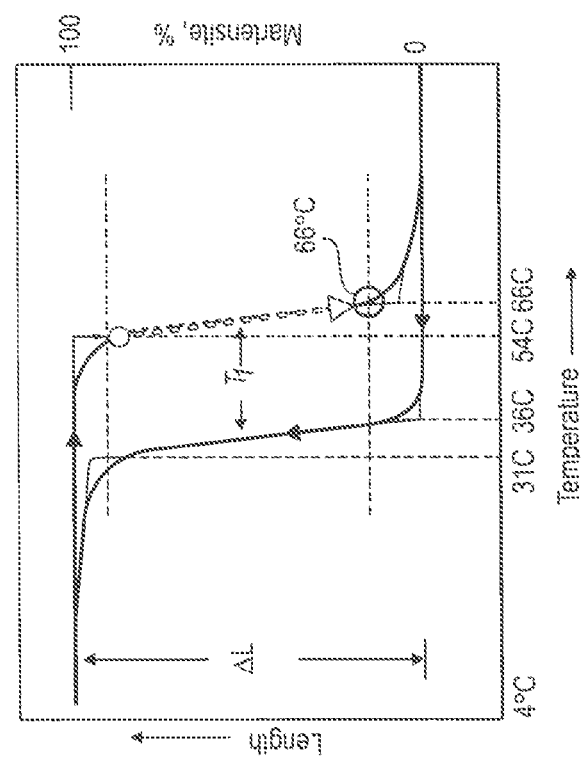
Figure 5F:
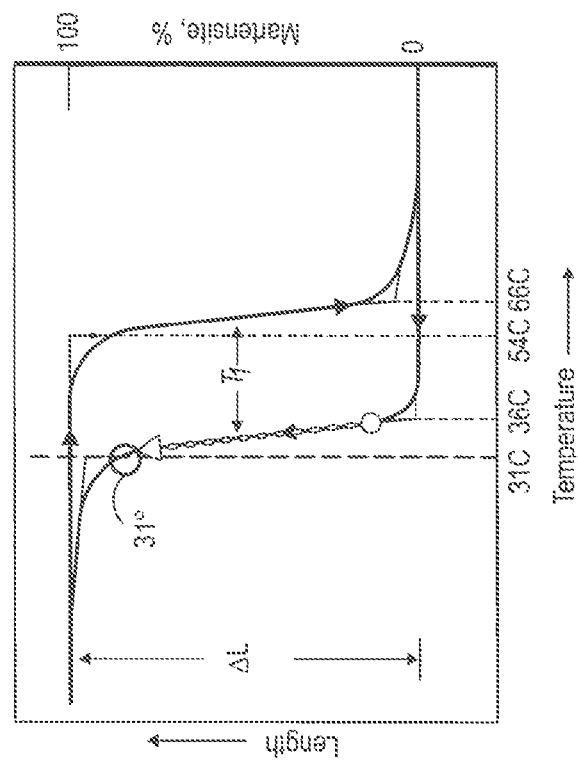
Figure 5E:
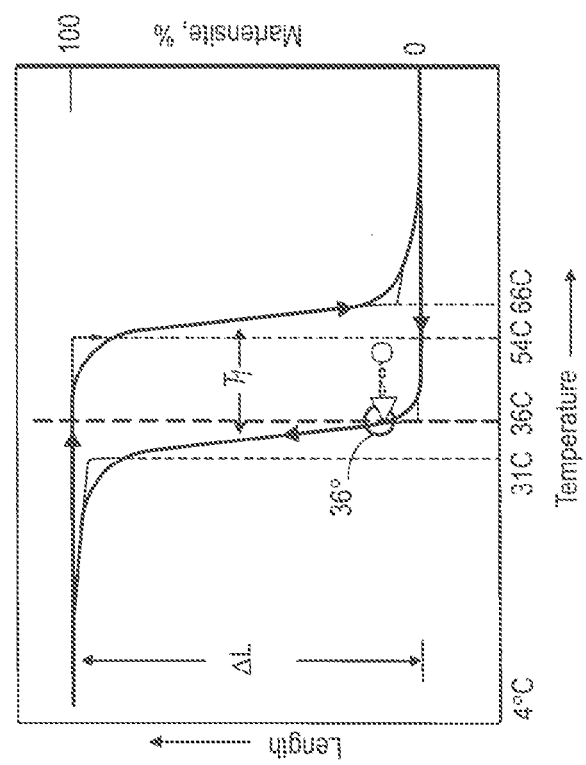

A strain versus temperature plot such as FIG. 4 can be used to determine the temperature of the spacer 62 to be achieved by the heater 60. For example, FIGS. 5A through 5G illustrate a sequence of increasing and decreasing the temperature of the spacer 62 that can be employed in one embodiment of the present disclosure. In FIG. 5A, the spacer 62 is at full length, and heater 60 is activated. As the spacer 62 warms up (FIG. 5B), the spacer 62 begins contracting and the temperature is 54° C. When the spacer 62 is warmed to 66° C. (FIG. 5C), the spacer 62 has contracted 8%. At this point, the pump 36 can be started with reduced mechanical seal force, i.e., the mechanical seal applies reduced pressure on the surrounding rotating seal component and torque transmission component. FIG. 5D illustrates this point where the pump is started and the heater 60 is turned off. The temperature of the spacer 62 begins dropping to about 36° C. (FIG. 5E). FIG. 5F illustrates the spacer 62 at a temperature of about 31° C. At this point, the spacer 62 and therefore the device 100 are at full length. FIGS. 5A through 5F illustrate a process for starting up the pump 36 in order to reduce wear on the faces of the rotating part 42 and the stationary part 44 of the mechanical seal. This illustrates how the spring-spacer assembly lowers the compression force at temperatures above a transition temperature and in a certain temperature range (e.g., 54° C. to 70° C.) to decrease the mechanical shaft seal's friction at pump start-up.

Figure 5G:
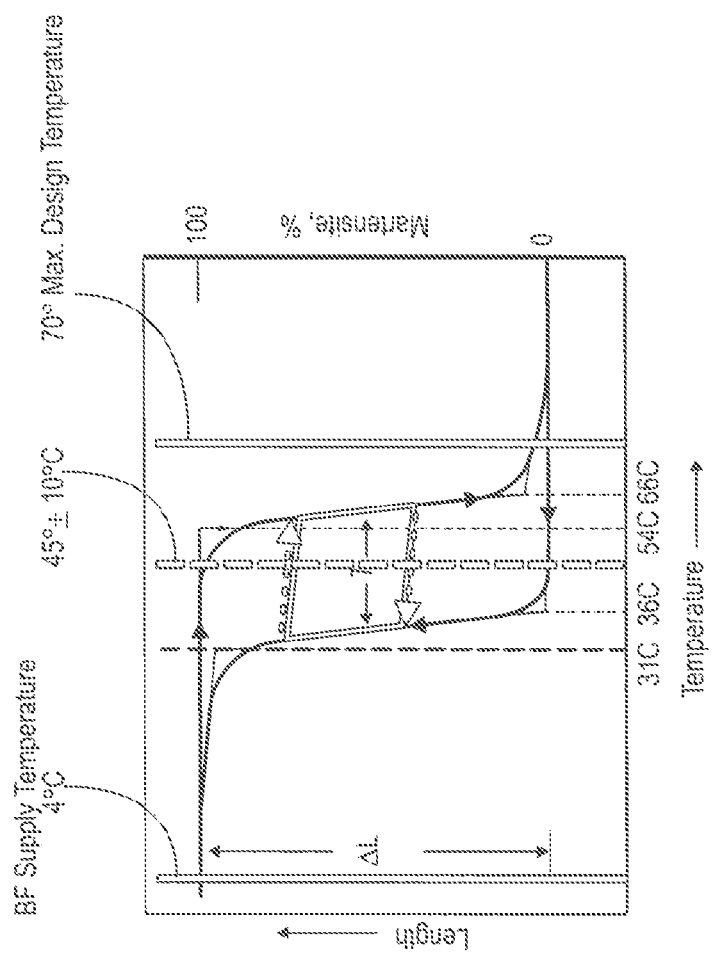

FIG. 5G illustrates how the temperature can be regulated by adjusting the heater 60 to control the amount of gap between the rotating part 42 and the stationary part 44 of the mechanical seal while the pump 36 is running. This can be useful for allowing more barrier fluid where applicable into the gap as needed.

The spring 64 has a first end and a second end. The spacer 62 has a first end and a second end. In one embodiment, the first end of the spring 64 is configured for contacting the rotating mechanical seal component 42, the second end of the spring is configured for contacting the first end of the two-way shape memory alloy spacer 62, and the second end of the two-way shape memory alloy spacer is configured for contacting the torque transmission component 38 or 56. In another embodiment, the first end of the two-way shape memory alloy spacer 62 is configured for contacting the rotating mechanical seal component 42, the second end of the two-way shape memory alloy spacer 62 is configured for contacting the first end of the spring 64, and the second end of the spring 64 is configured for contacting the torque transmission component 38 or 56.

In one embodiment, as in FIG. 2, the rotating mechanical seal component 42 and the torque transmission component 38 are part of the pump 36. In another embodiment, not shown, the rotating mechanical seal component 42 and the torque transmission component 38 are part of the motor 6. In yet another embodiment, not shown, the rotating mechanical seal component 42 and the torque transmission component 38 are located between the motor 6 and the pump (or compressor) 36.

In one embodiment, the use of the mechanical seal assistance device 100 described above and located between the rotating mechanical seal component 42 and the torque transmission component 38 or 56 and applying a compression force on the rotating mechanical seal component and the torque transmission component provides a means for controlling the friction within the seal in a pump or compressor system. The system can be a subsea pump or compressor system. The system can further include barrier fluid for lubricating and cooling the mechanical shaft seal assembly, cooling the motor and reducing the incidence of the pumped or compressed fluid contaminating the motor and the bearings as would be understood by one of ordinary skill in the art.

In one embodiment, a process for retrofitting a mechanical shaft seal assembly in a pump or compressor system is provided. First, an existing compression spring such as spring 50 shown in FIG. 1 between and in contact with the rotating mechanical seal component 42 and a torque transmission component 38 (or 56) in a pump mechanical shaft seal assembly 34 is removed. In the place of the removed compression spring 50, the mechanical seal assistance device 100 described above is installed such that the spring-spacer assembly is configured to rotate together with the rotating shaft 26 (or rotor 4 depending on the location of the mechanical seal 34) between the rotating mechanical seal component 42 and the torque transmission component 38 (or 56) and apply a compression force on the rotating mechanical seal component 42 and the torque transmission component 38 (or 56).

As described herein, the use of the device 100 enables lowering of the spring compression force within the mechanical shaft seal 34 before pump start up or on demand (when needed). The device 100 therefore lowers the compression force on critical surfaces within the mechanical shaft seal and lowers seal friction at start up or on demand and extends the life of the mechanical shaft seal. Subsea pump mechanical shaft seal failures is a main cause of subsea pump system failures.

Additional benefits provided by the use of the device 100 include providing a means to automatically regulate barrier fluid temperature to protect mechanical seal from high temperature by lowering the compression force on critical surfaces within the mechanical shaft seal, resulting in discharge of more barrier fluid to the critical surfaces. In one embodiment, if barrier fluid becomes too warm for any reason, the seal using the device 100 can allow barrier fluid to discharge to the pump housing in higher rates by relaxing/lowering the compression force on the mechanical shaft seal. Much colder fluid replaces the discharged fluid therefore the overall barrier fluid temperature is lowered, increasing the motor life. The discharged barrier fluid at around 55° C. or higher can be replaced by cold barrier fluid from a supply line (e.g., about 4° C., or seawater temperature).

In one embodiment, if mechanical shaft seal friction is increased, its temperature therefore increases. Since the spacer 62 is close, it will be affected by the increased temperature, and as a response, it contracts and automatically lowers the compression force. The phase change temperature range of the spacer 62 can be engineered such that it can automatically regulate the mechanical shaft seal friction and compression force on the mechanical seal. Decreased compression results in decreased friction and increased barrier fluid film thickness and also increased barrier fluid discharge. Consequently, the system reaches equilibrium at a less harmful level improving pump life.

In one embodiment, the use of the device 100 provides a means to increase the compression force on critical surfaces within the mechanical shaft seal while the pump 36 is not running, thereby lowering incidence of barrier fluid leak, saving barrier fluid.

In one embodiment, the pump 36 can be run with a slightly deteriorated mechanical seal by lowering the compression force through the use of the device 100. Further mechanical seal damage can thereby be prevented or minimized.

In one embodiment, if the pump 36 is suddenly stopped (such as during emergency shut down), the suction pressure of the pump will rapidly increase. The barrier fluid (when used) pressure cannot follow the rapid increase of the pump suction pressure due to control system reaction time limitations. The barrier fluid pressure can advantageously be increased while the pump is running to compensate for the higher pump suction pressure transients by lowering the pump mechanical seal compression force. In this case total maximum force applied by the seal assembly and barrier fluid to the mechanical seal stays the same while allowing higher differential pressure for the pump. In some cases increased pump differential pressure allows higher production rates.

It should be noted that only the components relevant to the disclosure are shown in the figures, and that many other components normally part of a subsea pump or compressor system are not shown for simplicity.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

From the above description, those skilled in the art will perceive improvements, changes and modifications, which are intended to be covered by the appended claims.

What is claimed is:

1. A mechanical seal assistance device for use in a mechanical shaft seal assembly in a motor/pump assembly comprising a motor, and a pump or a compressor, wherein the motor drives a rotor coupled to a rotating shaft for operating the pump or the compressor, the mechanical seal assistance device comprising:
   a. a spring-spacer assembly comprising:
      i. a spring having a first end and a second end;
      ii. a two-way shape memory alloy spacer having a first end and a second end wherein one of the first and second ends of the two-way shape memory alloy spacer is in contact with one of the first and second ends of the spring; wherein the spring and the two-way shape memory alloy spacer are configured to rotate together with the rotor or the rotating shaft in the mechanical shaft seal assembly between a rotating mechanical seal component and a torque transmission component and apply a compression force on the rotating mechanical seal component and the torque transmission component; and wherein the two-way shape memory alloy spacer is formed of a shape memory alloy material having a contracting transition temperature such that the two-way shape memory alloy spacer contracts in length when the two-way shape memory alloy spacer is heated to a temperature above the contracting transition temperature; and
   b. a heater capable of heating the two-way shape memory alloy spacer from a temperature below the contracting transition temperature to a temperature above the contracting transition temperature;
   such that when the two-way shape memory alloy spacer is heated from a temperature below the contracting transition temperature to a temperature above the contracting transition temperature, the spring-spacer assembly applies a reduced compression force on the rotating mechanical seal component and the torque transmission component.

2. The mechanical seal assistance device of claim 1, wherein the first end of the spring is configured for contacting the rotating mechanical seal component, the second end of the spring is configured for contacting the first end of the two-way shape memory alloy spacer, and the second end of the two-way shape memory alloy spacer is configured for contacting the torque transmission component.

3. The mechanical seal assistance device of claim 1, wherein the first end of the two-way shape memory alloy spacer is configured for contacting the rotating mechanical seal, the second end of the two-way shape memory alloy spacer is configured for contacting the first end of the spring, and the second end of the spring is configured for contacting the torque transmission component.

4. The mechanical seal assistance device of claim 1, wherein the spring comprises a wave spring.

5. The mechanical seal assistance device of claim 1, wherein the heater comprises a source of electrical current applied to the two-way shape memory alloy spacer.

6. The mechanical seal assistance device of claim 1, wherein the two-way shape memory alloy spacer is axially symmetrical and the heater is positioned axially symmetrically around the spacer.

7. A pump or compressor system, comprising:
   a. a pump or compressor configured to continuously impart energy to a pumped or compressed fluid having a rotating shaft and a rotating component selected from impellers, propellers, and turbine blades;
   b. a motor configured to drive a rotor;
   c. a coupling configured to transfer rotary motion from the rotor to the rotating shaft of the pump or compressor; and
   d. a mechanical shaft seal assembly configured to minimize leaking of the pumped or compressed fluid into a surrounding environment; wherein the mechanical shaft seal assembly comprises the mechanical seal assistance device of claim 1 located between the rotating mechanical seal component and the torque transmission component and applying a compression force on the rotating mechanical seal component and the torque transmission component.

8. The pump or compressor system of claim 7, wherein the mechanical shaft seal assembly further comprises an O-ring located between the rotating mechanical seal component and the mechanical seal assistance device to further reduce leaking of the pumped or compressed fluid into the surrounding environment.

9. The pump or compressor system of claim 7, wherein the torque transmission component comprises a rubber bellows.

10. The pump or compressor system of claim 7, further comprising a torque transfer ring located adjacent the spring-spacer assembly for transferring torque between the rotating mechanical seal component and the spring-spacer assembly.

11. The pump or compressor system of claim 7, further comprising a barrier fluid for lubricating and/or cooling the mechanical shaft seal assembly, cooling the motor and/or reducing the incidence of the pumped or compressed fluid contaminating the motor.

12. The pump or compressor system of claim 7, wherein the motor comprises the mechanical shaft seal assembly.

13. The pump or compressor system of claim 7, wherein the pump or the compressor comprises the mechanical shaft seal assembly.

14. The pump or compressor system of claim 7, wherein the mechanical shaft seal assembly is located between the pump or the compressor and the motor.

15. The pump or compressor system of claim 7, wherein the heater comprises a source of electrical current applied to the two-way shape memory alloy spacer.

16. The pump or compressor system of claim 7, wherein the two-way shape memory alloy spacer is axially symmetrical and the heater is positioned axially symmetrically around the spacer.

17. A process for operating a pump or compressor, the process comprising:

a. prior to starting up the pump or compressor system of claim 7, activating the heater to heat the two-way shape memory alloy spacer of the mechanical seal assistance device until the two-way shape memory alloy spacer completes a phase change from martensite to austenite thereby shortening the two-way shape memory alloy spacer such that the spring-spacer assembly applies a reduced compression force on the rotating mechanical seal component and the torque transmission component;

b. starting the pump or compressor; and c. deactivating the heater and allowing the two-way shape memory alloy spacer to cool until the two-way shape memory alloy spacer completes a phase change from austenite to martensite thereby lengthening the two-way shape memory alloy spacer such that the spring-spacer assembly applies an increased compression force on the rotating mechanical seal component and the torque transmission component.

18. A process for retrofitting a mechanical shaft seal assembly in a system comprising a pump or compressor, the process comprising:

a. removing an existing compression spring; and b. in the place of the removed compression spring, installing the mechanical seal assistance device of claim 1 such that the spring-spacer assembly is configured to rotate together with the rotor or the rotating shaft between the rotating mechanical seal component and the torque transmission component and apply a compression force on the rotating mechanical seal component and the torque transmission component.

* * * * *